June 3, 1958
J. R. MILLARD
2,837,358
CLAMP CONSTRUCTION
Filed Feb. 8, 1954
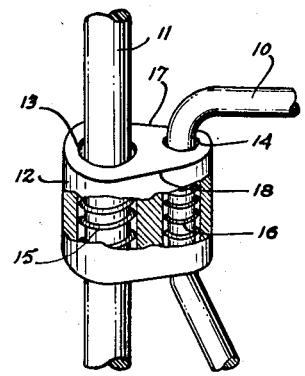
INVENTOR:
JOHN R. MILLARD
Bailey, Stephens & Huettig
ATTORNEYS

United States Patent Office 2,837,358
Patented June 3, 1958

2,837,358

CLAMP CONSTRUCTION

John R. Millard, Perth, Ontario, Canada

Application February 8, 1954, Serial No. 408,923

Claims priority, application Canada January 25, 1954

1 Claim. (Cl. 287—118)

This invention relates to a clamp construction and more particularly to a clamp construction for securing structural members.

The object of this invention is to provide a clamp construction having a clamp which can be moved into position on the structural member or members being secured and can then be clamped to the structural member to provide a rigid and secure connection.

In the drawing which illustrates the preferred embodiment of this invention:

Figure 1 is a perspective view partly cut away showing the preferred clamp construction.

In Figure 1 wire 10 is clamped to rod 11 by means of clamping sleeve 12. Clamping sleeve 12 is preferably formed by cutting a section of appropriate length from an extruded section of a deformable metal such as aluminum. Clamping sleeve 12 has holes 13 and 14 to receive rod 11 and wire 10 respectively. These holes are preferably formed during the extrusion of the section. A coil securing spring 15 is placed in hole 13 to encircle rod 11 and another coil securing spring 16 is placed in hole 14 to encircle wire 10. These springs are made from metal which is harder than the metal used for the rod, the wire and the clamping sleeve. Thus the rod, the wire and the clamping sleeve can be made from aluminum and the spring from hardened stainless steel. The sides 17 and 18 of the sleeve are tightly crimped and this causes the springs to become embedded both in the clamping sleeve and in the rod and wire respectively. The result is that the rod and wire are rigidly clamped in position in the clamping sleeve.

As an alternative which is considered to be within the scope of this invention when considered in its broadest aspect, grit such as abrasive grit can be used in place of springs 15 and 16. The grit can be applied by coating the interior of the sleeve with baking lacquer and powdering the grit on the surface of the baking lacquer before it has dried. The grit should be of a material which is harder than that of the sleeve, the rod or the wire.

It will be appreciated from the foregoing that a clamping construction has been provided which is simple in construction and which can conveniently be positioned on the structural members to be joined and which provides a secure joint.

I claim:

A clamp construction comprising the combination of a structural rod, a structural connecting wire having a portion extending substantially parallel to said structural rod, a deformable clamping sleeve integrally formed as a solid block having a first aperture to receive said structural rod and a second aperture spaced from and substantially parallel to the first aperture to receive said portion of the structural connecting wire, a web forming part of said solid block extending between said first and second apertures and being integral at each end with said deformable clamping sleeve, and securing means, formed from material harder than the materials from which the clamping sleeve structural rod and structural connecting wire are formed and consisting of a coil spring, within said apertures between the clamping sleeve and the rod and said portion of the structural connecting wire respectively adapted to become embedded in the surfaces of the clamping sleeve, structural rod and structural connecting wire upon crimping of the clamping sleeve to deform the shapes of said apertures, said apertures prior to deformation providing sufficient clearance between the clamping sleeve and the structural rod and structural connecting wire respectively to receive said securing means, without said securing means being embedded in said surfaces and to permit sliding movement between said clamping sleeve and said structural rod and structural connecting wire respectively.

References Cited in the file of this patent

UNITED STATES PATENTS

| | | |
|---|---|---|
| 438,400 | Brennan | Oct. 14, 1890 |
| 468,293 | Coleman | Feb. 2, 1892 |
| 2,149,209 | Dickie | Feb. 28, 1939 |
| 2,261,372 | Holke | Nov. 4, 1941 |